July 1, 1952 — R. C. GILBERT — 2,602,096
VOLTMETER
Filed July 5, 1949 — 2 SHEETS—SHEET 1
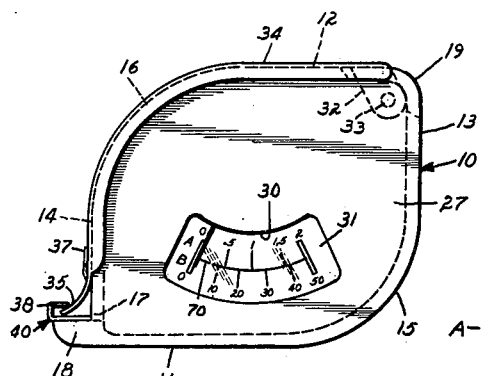
FIG. 1
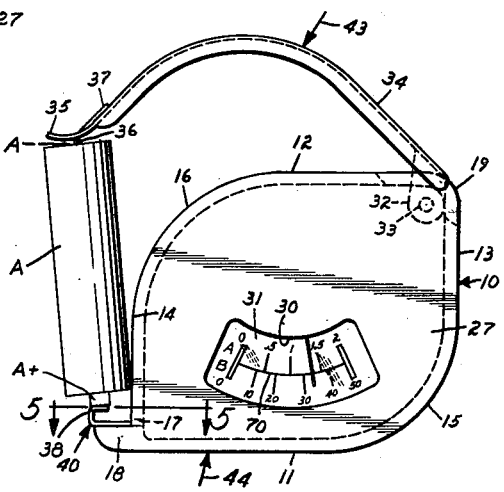
FIG. 2
FIG. 3
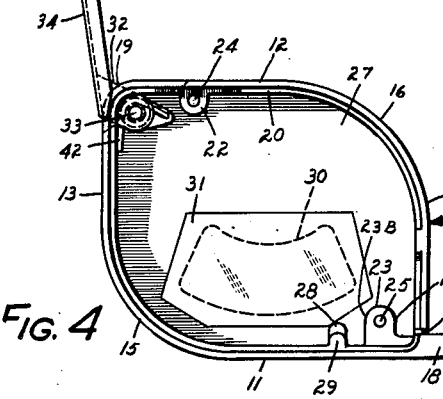
FIG. 4
FIG. 6
FIG. 5
INVENTOR.
RUSSELL C. GILBERT
BY Paul, Paul & Moore
ATTORNEYS July 1, 1952  R. C. GILBERT  2,602,096
VOLTMETER
Filed July 5, 1949  2 SHEETS—SHEET 2
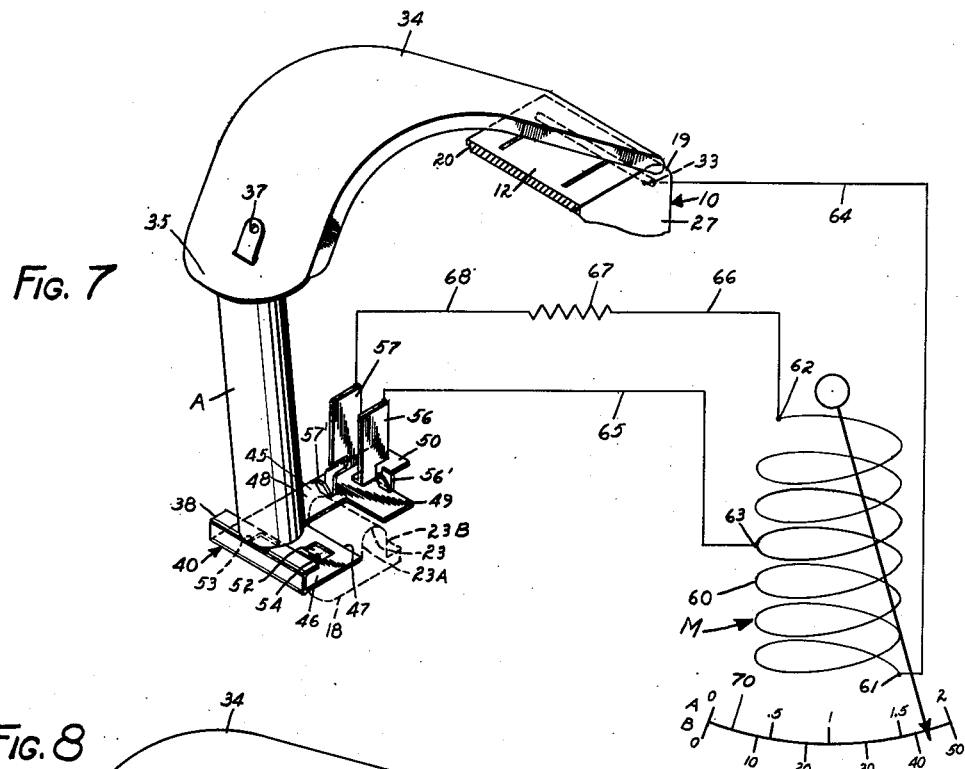
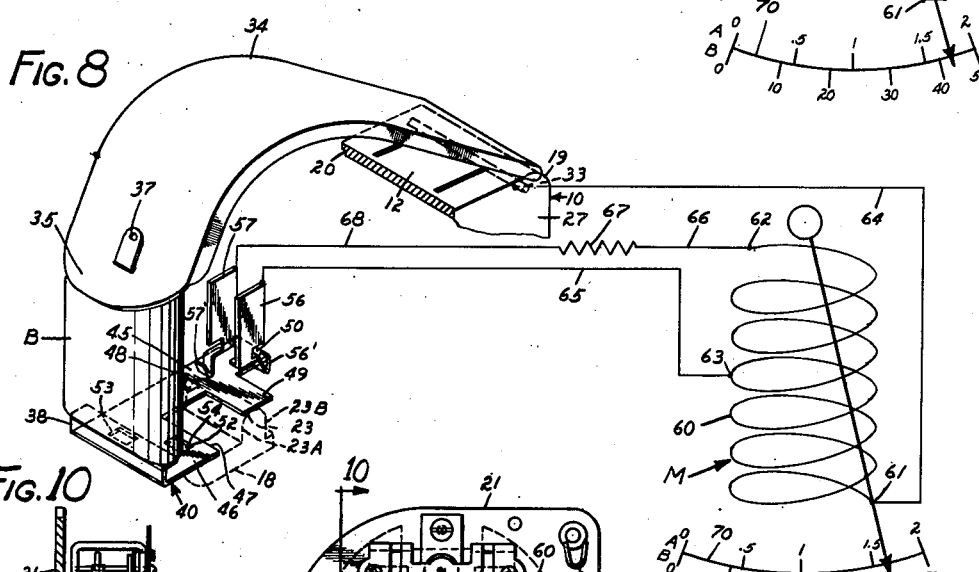
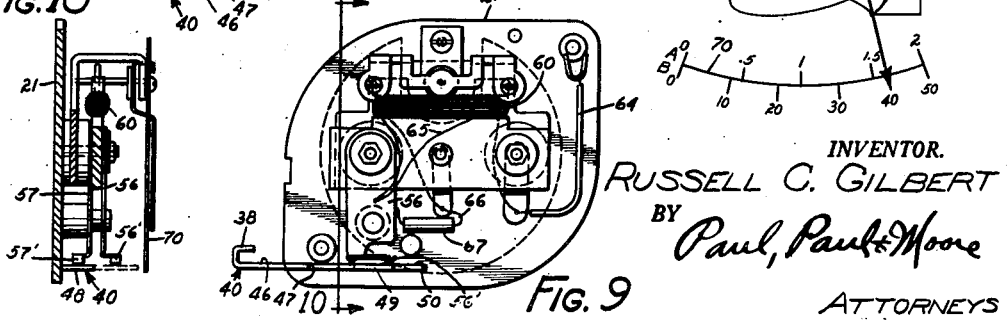
INVENTOR.
RUSSELL C. GILBERT
BY Paul, Paul & Moore
ATTORNEYS Patented July 1, 1952

2,602,096

UNITED STATES PATENT OFFICE 2,602,096

VOLTMETER

Russell C. Gilbert, Stillwater, Minn., assignor to Telex Inc., Minneapolis, Minn., a corporation of Minnesota Application July 5, 1949, Serial No. 103,005

8 Claims. (Cl. 171—95)

This application relates to voltmeters and is particularly directed to a device which can be used conveniently by inexperienced persons for the testing of A and B batteries of portable audio amplifying devices, such as hearing aids. In the operation of hearing aids there are continuously used A and B batteries, the A battery being the small cell having a voltage in the range of 1½ to 3 volts, and the B battery composed of a plurality of cells having a voltage in the range of 15–50 volts. Since these hearing aid devices are used continuously, the batteries become discharged and their voltage decreases, and they must be replaced or recharged periodically.

Heretofore there has not been available a convenient easily used device for measuring the voltages of such batteries. Since hearing aids are used mostly by persons who are inexperienced in respect to electrical matters and frequently by elderly persons, it is essential that a voltmeter for testing such A and B batteries be of the simplest construction and very easily used.

It is an object of the invention to provide a small compact multiple scale voltmeter for use in testing A and B batteries of portable audio amplifying devices and particularly for the testing of the A and B batteries of hearing aid sets.

It is another object of the invention to provide a voltmeter of multiple scale type which has in conjunction with it a convenient contact making device for contacting the terminals of hearing aid or other audio amplifying device batteries or cells of varying sizes and shapes, without the necessity of auxiliary connectors for the purpose of testing the voltage.

It is a further object of the invention to provide an improved voltmeter of multiple scale type having a combined case and contact mechanism of foolproof character, such that the mere opening of the case readies the instrument for use on the cells with which it is intended to be used.

It is a further object of the invention to provide an improved voltmeter case and cover, together with contacting arrangements for use with multiple scale voltmeter testing operations wherein the lock of the case also constitutes a contact and may further be used to change the electrical connections within the voltmeter for varying the voltage measuring range of the instrument to suit varying sizes of batteries.

Other and further objects of the invention are those inherent in the apparatus herein illustrated, described and claimed.

The invention is illustrated with reference to the drawings in which corresponding numerals refer to the same parts, and in which Figure 1 is a front elevational view of the voltmeter shown with the instrument contacts in closed or carrying position;

Figure 2 is also a front elevational view showing the contacts positioned for testing an A battery cell;

Figure 3 is also a front elevational view showing the contact clips arranged for testing a B battery cell;

Figure 4 is a rear elevational view of the case of the voltmeter showing the back cover and the voltage reading instrument removed from the case;

Figure 5 is a fragmentary sectional view taken along the line 5—5 of Figure 2, illustrating the position of the lower contact which is at the same time a locking clip of the case positioned for adjusting the voltage reading instrument to the low voltage range suitable for measuring the voltage of an A cell;

Figure 6 is a view corresponding to the view of Figure 5, except that it is taken along the line and in the direction of arrows 6—6 of Figure 3, showing the contact clip and switching arrangement adjusted to a position such that the instrument is at the high voltage scale suitable for reading the voltage of a B battery;

Figure 7 is a partial isometric and partially schematic view of the instrument showing the contacting arrangement adjusted for the reading of lower voltages such as the voltage of an A cell;

Figure 8 is a view corresponding to Figure 7, being a partially isometric and partially schematic view showing the clip and contact arrangement adjusted for the reading of higher voltages, such as the voltage of B batteries;

Figure 9 is a front view of the back panel of the instrument removed from the case, and with the dial removed showing the instrument and mechanism mounted thereon; and Figure 10 is a sectional view taken along the line and in the direction of arrows 10—10 of Figure 9.

Referring to the drawings the instrument includes a case generally designated 10 having a pair of parallel sides 11—12 opposite each other and another pair of parallel sides 13 and 14. Between the sides 11 and 13 the case is smoothly rounded off as at 15, and the case is likewise smoothly rounded off at 16 between the sides 14 and 12. Between the sides 12 and 13 there is a short curve 19 which serves as a pivot arrangement, as hereinafter described. Between the sides 11 and 14 the case is molded so as to provide a slide aperture at 17 and a slide rest at 18. Viewed from the rear, as shown in Figure 4, the case has an internal flange 20 completely around the inner surface of its side walls so as to provide a ledge on which a closure cover 21 can be attached. The case is provided with internal bosses at 22 and 23 in which there are threaded apertures 24 and 25, respectively, for attaching the rear cover 21 of the case by means of countersunk screws which pass through cover 21 into bores 24—25. The internal boss 23 extends from the front cover 27 of the case, partially toward the rear cover and more exactly to the line 26, as shown in Figures 5 and 6. Closely adjacent the boss 23 is a smaller boss 28 which is of maximum elevation nearest the front cover and is cut down at 29 so as to form an internal slide for the contact and clip arrangement, as hereinafter described.

The front cover 27 of the case is provided with an opening at 30 of partial arcuate form, on the inside of which there is a covering of glass or other transparent material 31 through which the instrument hand and scale can be viewed. At the junction of the side walls 12 and 13, as shown in Figure 4, the side walls are cut down sufficiently so as to permit arms 32 to project outwardly from the pivot 33 within the case. Upon the arm 32 there is mounted a shaped contact making arm 34 which is shaped to conformity with the case side walls 12—16—14, as shown in Figure 1, being terminated at its outer end in an outwardly extending curved portion 35. The member 34 is flanged over at the front and back to embrace the adjacent front and back edges of the case, when in the Figure 1 (closed) position. The curved portion 35 is apertured and a contact point 36 is fastened so as to extend therethrough, the contact being soldered or otherwise fastened to the main arm 34 at the point 37. The curved portion 35, when the contact arm is swung down in place on the case, as in Figure 1, extends outwardly so that it is easily engaged by the inturned end 38 of a combined slip, contact and switching arrangement generally designated 40. The contact arm 34 is provided with a spiral spring generally designated 42 which normally causes the contact arm 34 to swing outwardly to the position shown in Figure 4 when the member 40 is pulled out so as to release end 35 of arm 34. The contact arm 34 can be returned to any of its intermediate positions, such as those shown in 2 or 3, by grasping the case by the fingers, applying pressure at the points 43 and 44 so as to cause the contact arm and the contact point 36 to engage upon an A cell, designated A, as shown in Figure 2, pressing the positive contact of the A cell designated A+ against the combined lock, contact and clip 40, and pressing the contact 36 against the negative battery terminal A— as shown in Figure 2. For testing other sizes of cells or batteries contact arm may be pressed down against the action of the spring 42 to the position shown in, for example, Figure 3, which illustrates the testing of a B battery. Likewise, when the tester is not in use the contact arm 34 can be pressed to the closed position shown in Figure 1, and the combined contact, switch and clip member 40 is then pushed to the position shown in Figure 1, thus engaging upon the curved surface 35 of the contact arm 34 and holding it in closed position.

Referring particularly to Figures 5 through 8, the combined clip, contact and switch, generally designated 40, includes a flat plate portion 45 and an outer end which is inturned to the shape shown in Figures 1–3, as indicated at 38. The flat plate portion 45 is of maximum width at the portion 46, but is notched deeply at 47 to the width 48 whereupon at 49 the width is again increased until in sliding engagement with the edge of the raised portion 28 of the slideway 29. At the inner end of the member 40 the width is again narrowed at 50. The member 40 slides upon the surface 16 of the case and slides through the opening 17 previously referred to, which serves thus to support and define the path of motion of the outer end of member 40. The inner portion of member 40 slides upon the curved lower surface 29 of the inner boss 28. The combined clip, latch and switching arrangement 40 is movable inwardly and outwardly with respect to the case from the position shown in Figure 5, which is the A cell testing position (Figure 2) and also the latching position for member 34 (Figure 1) to the pulled-out position shown in Figure 6, which is the position for testing B batteries.

It will be noted that the flat surface 28 of the case has a designation "A," as indicated at 51 Figure 5, and another designation "B," at 52, as indicated in Figure 6. The outer flat portion 46 of the combined clip, contact and switching arrangement 40 has a rectangular opening cut-out at 53 located so that when the member 40 is moved to its inner position, in which A cells are tested, the letter "A" will be exposed, thus indicating to the user that the combined clip, contact and switching arrangement is in the position for testing "A" cells. Likewise, the flat area 46 of the member 40 has a rectangular opening at 54 so located that when the member 40 is moved to its outermost position, as shown in Figure 6, the letter "B" will be exposed through the opening, thus indicating to the user that the combined contact, clip and switching arrangement is in the proper position for testing "B" batteries.

The switching function of the member 40 is accomplished by the action of the member 40 with reference to a pair of contacts generally designated 56 and 57, Figures 7 and 8. The contacts are mounted upon the meter structure itself, which is otherwise of standard construction, the meter being mounted on the rear cover 21 of the case, as shown in Figures 9 and 10. It may be pointed out that the meter structure is mounted upon the rear cover plate 21, Figures 9 and 10, the rear cover plate 21 being held in place by suitable screws entering the threaded apertures 24 and 25 of the case. The meter is of standard construction and includes a coil 60 having two end contacts 61 and 62 and a mid-contact 63. The contact 61 of the meter is connected by a suitable internal connection to the hinge pin 33 (Figure 9), upon which the contact arm 34 is mounted and to which it is connected. See Figures 7 and 8. Thus, the contact arm 34 is electrically connected through the line 64 to the terminal 61 of the meter coil. The terminal 63 is connected by means of line 65 to the switch contact 56, which is mechanically mounted upon the meter structure, as shown in Figures 9 and 10. The end terminal 62 of the meter coil is connected through the line 66 and through resistor 67 and line 68 to the contact 57, which is likewise mechanically mounted upon the meter structure. When the cover plate 21 of the case is in place on the case the meter structure is thus housed efficiently within the case, with the meter dial located behind the window 31 of the case, so as to expose the scale 70 of the meter to view through the opening 30. At the same time contacts 56 and 57 are mechanically positioned so that their lower flexible ends 56' and 57' will be in engagement with and press down upon the upper surface of that portion of member 40 within the case. It will be noted that the location of contacts 56 and 57 is such that the contact point 56' is in alignment with the projecting area 49 of the member 40, whereas the contact 57' is in alignment with the area 48—45. The contacts 56 and 57 are so located within the case that when the combined clip, contact and switching member 40 is in the position shown in Figure 5, the contacts 56' and 57' will both be in engagement with the member 40. Thus, 56' will, in the Figure 5 position, bear down upon the portion 49 of the member 40, and 57' will bear down upon the portion 48 of the member 40. In this way a short circuit is applied through the contacts to that portion of the meter coil which is between the terminals 62 and 63, thus leaving only as an effective meter coil that portion between the terminals 63 and 61. The lower number of turns thus provided in the meter coil is suitable for the measurement of lower voltages, such as the voltages of A cells.

When the combined contact, clip and switching arrangement member 40 is moved to the position shown in Figure 6, the contact 57' still remains in engagement with the portion 48 of the member 45, but the contact 56' has, under such conditions, run off the edge of portion 49 of the member 40. Accordingly, the circuit through the instrument is from the member 40, through contact 57'—57, line 68, resistor 67, line 66 to terminal 62 of the meter coil and thence through the entire meter coil to terminal 61 and line 64 to the hinge 33 and to the swinging contact 34. Accordingly, the entire meter coil, as well as the resistor 67, is effectively in circuit and the meter is in a condition suitable for the measurement of higher voltages, such as the voltages of B batteries.

The limits of movement of the member 40 in respect to the case are determined by the surfaces 47 and 49 of the member 40. Thus, it will be observed that when the sliding contact, clip and switch arrangement 40 is in the position shown in Figure 5, the surface 47 is in engagement with that portion 23A of the boss 23 which is nearest the case wall 14, whereas when member 40 is moved to the position shown in Figure 6, the portion 49 of the member 40 is in engagement with the opposite surface 23B of boss 23. Thus, the boss 23, and more particularly the surfaces 23A and 23B thereof, in cooperation with the surface 47 of the member 40 and the portion 49 of the member 40 determines the limits of the sliding movement back and forth of the member 40. The member 40 is always held firmly in the position shown in Figures 1–3 and 7 and 8, due to the downward pressure of the resilient contact tips 56' and 57' of the contacts 56 and 57. The entire member 40 can be removed from the case after the cover member 21 has been removed, since the slot 17, Figure 4, is open towards the rear portion of the case.

It is, therefore, clear that when the user desires to measure the voltage of an A cell, it is only necessary to pull out the slide 40 from the position shown in Figure 1 to its outermost position so as preliminarily to release the swinging contact 34, after which the slide 40 is again pressed into the position shown in Figures 2 and 5, which exposes the letter "A" through opening 51, as shown in Figure 5, whereupon the A cell is gripped with the tip 36 against the negative terminal and the upper inturned end 38 of the slide member 40 in contact with the positive terminal of the cell, thus establishing contact between the cell A and the swinging contact 34 and the sliding contact 40. It may be noted parenthetically that the negative terminal of the cell A should always be applied to the swinging contact 34, whereas the positive terminal is applied to the sliding contact 40. When contact has thus been made, the meter generally designated M, having the scale face 70, indicates on the lower voltage scale "A" of Figure 2. It will be remembered that when the clip-contact-switch member 40 has been moved to the position shown in Figures 2 and 5, this has automatically accomplished the switching of the meter to the circuit conditions shown in Figure 7, which shorts out that portion of the meter coil 60 between the terminals 62 and 63, as previously described, and thus conditions the meter for the measurement of low voltages.

When the user desires to use the meter for the testing of the B batteries, the slide 40 is pulled out to the position shown in Figure 6. In this position the designation "B" is visible through the aperture 52, as shown in Figure 6, so that user knows that the slide is in the proper position. The B battery of Figure 3 is then gripped between the swinging contact 34 and the slide contact 40 again with the positive pole of the battery on member 40, and the voltage is then read on the "B" scale visible through the opening 30 of the meter case. It will be remembered that when the slide 40 has been pulled out to the position shown in Figures 3 and 6, it has automatically accomplished the switching arrangement previously described, with reference to Figure 8, whereupon resistor 67 is connected in series with the full number of turns of the winding 60 of the meter M, thus conditioning the meter for the measurement of higher voltages.

As many apparently widely different embodiments of this invention may be made without departing from the spirit and scope thereof, it is to be undertsood that I do not limit myself to the specific embodiments herein.

What I claim is:

1. A combined A battery and B battery testing device comprising a case, a contact arm shaped so as to lie in conformity with an edge of the case, said contact arm having one of its ends pivoted to the case and the other end free to swing toward and away from the case, a sliding contact mounted on the case for movement through one wall of the case, said sliding contact being provided with detent means engageable with the free end of the swinging contact when the latter is swung to a position in engagement with the case for retaining said free end and hence the entire swinging contact closely adjacent said edge in a position suitable for carrying, a meter mounted within said case and having a winding a plurality of switch means within said case mounted for engagement with said sliding contact and being connected to the meter winding for changing the meter from a condition to read low voltages to a condition to read high voltages when the sliding contact is moved from a position close to the case to a position away from the case, said sliding contact and free end of the swinging contact forming terminal points between which the terminals of a battery or cell may be gripped for voltage testing.

2. A device for testing the voltage of A and B batteries comprising a case having a window therein, a multiple range voltmeter mounted in the case and having a double scale visible through said window, the winding of said voltmeter being such that it is suitable for measurement of low voltages, such as A battery voltages and high voltages, such as B battery voltages, switch means within the case, a slide movable through a slit in the case and being operably associated with said switch means, said switch means being connected to the meter winding, said slide in one position cooperating with said switch means for changing the meter connection to low voltage and being cooperable with said switch means for changing the meter connection for the reading of high voltages when the slide is moved to another position, the outer portion of said slide also forming a contact, a swinging member pivoted at one end to said case and being movable to a position to engage the case, said member being shaped to conform with the contour of that portion of the case engaged thereby, the free ends of the slide and swinging member being provided with cooperating detent means operable to retain the swinging member in engagement with the case, said swinging member and slide forming contacts between which a cell may be gripped for voltage testing.

3. A multiple scale voltmeter comprising a case, a slidable contact mounted on said case, a swingable contact pivoted at one end thereof to a side edge of the case in a manner to move towards and away from the slidable contact and to fold to a position close to said side edge, a plural scale range meter mounted within the case and having means for changing the meter connections from a low to a high voltage connection, switching means in said case operatively associated with said last named means, said switching means being operable by said slidable contact, whereby batteries of different voltages may be positioned to be tested between said contacts in various positions of the slidable contact.

4. In a voltmeter as set forth in claim 3 wherein the free ends of the contacts are provided with cooperating detent means, said detent means being operable to retain the swingable contact in a position adjacent to the case when the slidable contact is moved to its extreme inner position adjacent to the case.

5. In a voltmeter as set forth in claim 3 wherein the swingable contact is shaped to conform to the contour of the adjacent side edge of the case in a manner to permit said last named contact to lie close thereto in its folded inoperative position.

6. In a voltmeter as set forth in claim 3 wherein the case is substantially rectangular in shape, the slidable contact being positioned adjacent to one corner of the case and the swingable contact being pivoted adjacent to a corner of the case diagonally opposite to said first named corner.

7. In a voltmeter as set forth in claim 3 wherein the case is substantially rectangular in shape, the slidable contact being positioned adjacent to one corner of the case and being movable parallel outwardly in alignment with an adjacent side edge of the case, the swingable contact being pivoted adjacent to a corner of the case diagonally opposite to the first named corner whereby the slidably contact and said adjacent side edge are permitted to lie close to a base support.

8. In a voltmeter as set forth in claim 3 wherein the sliding contact includes a portion movable over a flat surface on the case, said portion being provided with a plurality of apertures, designations on said flat portion of the case visible through said apertures one at a time when the sliding contact is moved from a position near the case to a position withdrawn to a maximum distance from the case for indicating the position of said switching means within the case when said sliding contact is thus moved.

RUSSELL C. GILBERT.

REFERENCES CITED

The following references are of record in the file of this patent:

UNITED STATES PATENTS

| Number | Name | Date |
|---|---|---|
| 999,977 | Fish | Aug. 8, 1911 |
| 2,274,441 | Williams | Feb. 24, 1942 |

FOREIGN PATENTS

| Number | Country | Date |
|---|---|---|
| 123,471 | Great Britain | June 26, 1919 |
| 695,684 | France | Dec. 19, 1930 |

OTHER REFERENCES

Popular Mechanics Magazine, November 1946, page 142, "Pocket-Size Ammeter for Batteries Requires No Wires," published by Popular Mechanics Co., Chicago, Illinois.